Sept. 28, 1948.  D. P. FISHER  2,450,126

FLUID POWER STEERING MECHANISM

Filed April 30, 1945  2 Sheets-Sheet 1

INVENTOR.
DELBERT P. FISHER
BY H. O. Clayton
ATTORNEY

Sept. 28, 1948.     D. P. FISHER     2,450,126
FLUID POWER STEERING MECHANISM

Filed April 30, 1945     2 Sheets-Sheet 2

INVENTOR.
DELBERT P. FISHER.
BY H.O.Clayton
ATTORNEY.

Patented Sept. 28, 1948

2,450,126

UNITED STATES PATENT OFFICE 2,450,126

FLUID POWER STEERING MECHANISM

Delbert P. Fisher, South Bend, Ind., assignor to Bendix Aviation Corporation, South Bend, Ind., a corporation of Delaware Application April 30, 1945, Serial No. 591,111

1 Claim. (Cl. 180—79.2)

This invention relates in general to power steering mechanism and in particular to a pressure differential operated power steering mechanism adapted to be incorporated in the conventional steering mechanism of the present day automotive vehicle.

Attempts have been made to develop efficient power steering mechanism for motor vehicles employing fluid pressure motors controlled by follow-up valve mechanisms operable by the steering wheel and by the action of the fluid pressure motor so that a given turning movement of the steering wheel will be followed by a proportional operation of the fluid pressure motor, the motor causing a follow-up action of the valve mechanism. Now these devices have been found to be operable but not commercially satisfactory and accordingly have never come into commercial use to any appreciable extent. There are several reasons for the unsatisfactory operation of mechanisms of this type however one of the principal reasons is the complexity of the mechanism.

It is therefore the principal object of my invention to provide a very simple, compact and effective steering mechanism including a pressure differential operated motor controlled by a follow-up valve, said valve being referred to above.

Yet another object of my invention is to provide a power steering mechanism wherein by the employment of certain springs in the force transmitting means of the mechanism the operation of a manually controlled valve is effectively stabilized.

A further object of my invention is to provide a power steering mechanism including means operable to effect a steering of the vehicle solely by the physical effort of the driver for all normal steering operations, the power means of said mechanism being cut into operation only when a substantial resistance to movement of the steering wheels is encountered.

Other objects and advantages of the invention will be readily apparent to those skilled in the art from the following description taken in conjunction with the accompanying drawing which represents the preferred embodiment of my invention. After considering this embodiment skilled persons will understand that many variations may be made without departing from the principles disclosed and I contemplate the employment of any structures, arrangements or modes of operation that are properly within the scope of the appended claim.

Figure 1:
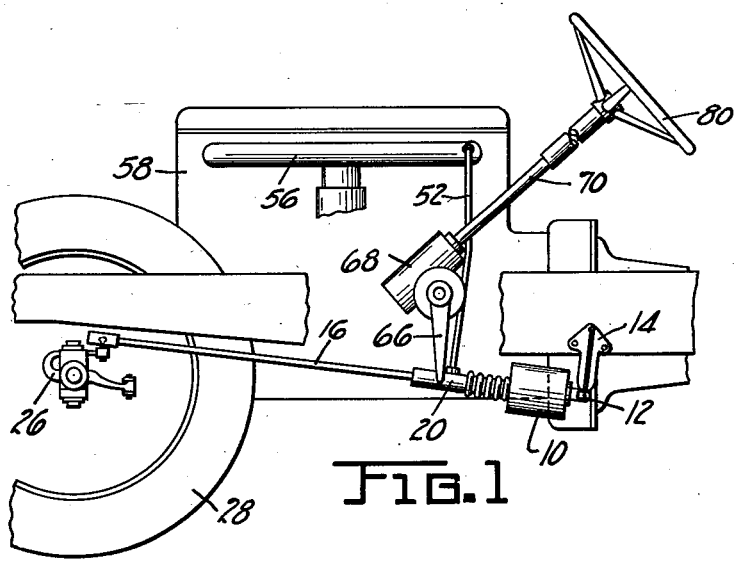
Figure 1 is a side elevational view disclosing the principal parts of a power steering mechanism constituting my invention.

Referring now to the two figures of the drawing disclosing a preferred embodiment of the power steering mechanism constituting my invention the double acting pressure differential operated motor 10 is pivotally mounted at 12 to a support member 14 which may be secured to the chassis of the vehicle. The power element, that is piston 15 of the motor 10 is connected to the drag link 16 of a conventional steering mechanism by means of a hollow connecting rod 18 and a hollow fitting 20. The rod 18 is threadedly connected at one of its ends to the hub portion 22 of the piston and at its other end to a fitting 24 which is threadedly mounted within the fitting 20; and the drag link 16 is preferably fixedly connected at one of its ends to said fitting 20. Completing the description of the conventional steering mechanism disclosed in Figure 1 the drag link 16 is pivotally connected to the steering knuckle 26 of a front wheel 28.

The valve mechanism for controlling the operation of the motor 10 is in two parts, one of said parts constituting the end portion 29 of the connecting rod 18, that is that portion of said rod which is threaded within the hub of the piston 15. This valve member 29 is provided with ports 30 and 32, Figure 2; and a cap member 34 is threadedly mounted on the end of the rod 18 said member providing a compartment 36. The other part of the two part valve mechanism constitutes a spool shaped end portion 38 of a member which is threadedly mounted, by means of an end member 40, upon one end of a hollow tube 42. This tube 42 lies within the hollow connecting rod 18 and is threadedly mounted, at one of its ends, to a fitting 44 which lies within the hollow fitting 20.

Figure 2:
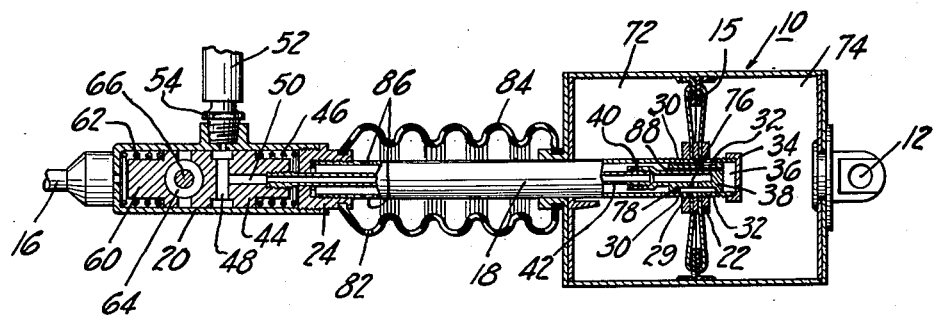
Figure 2 is a longitudinal sectional view of the double-acting pressure differential operated motor of my invention and its connection with the drag link of the steering mechanism, said connection constituting one of the features of said invention.
Figure 3:
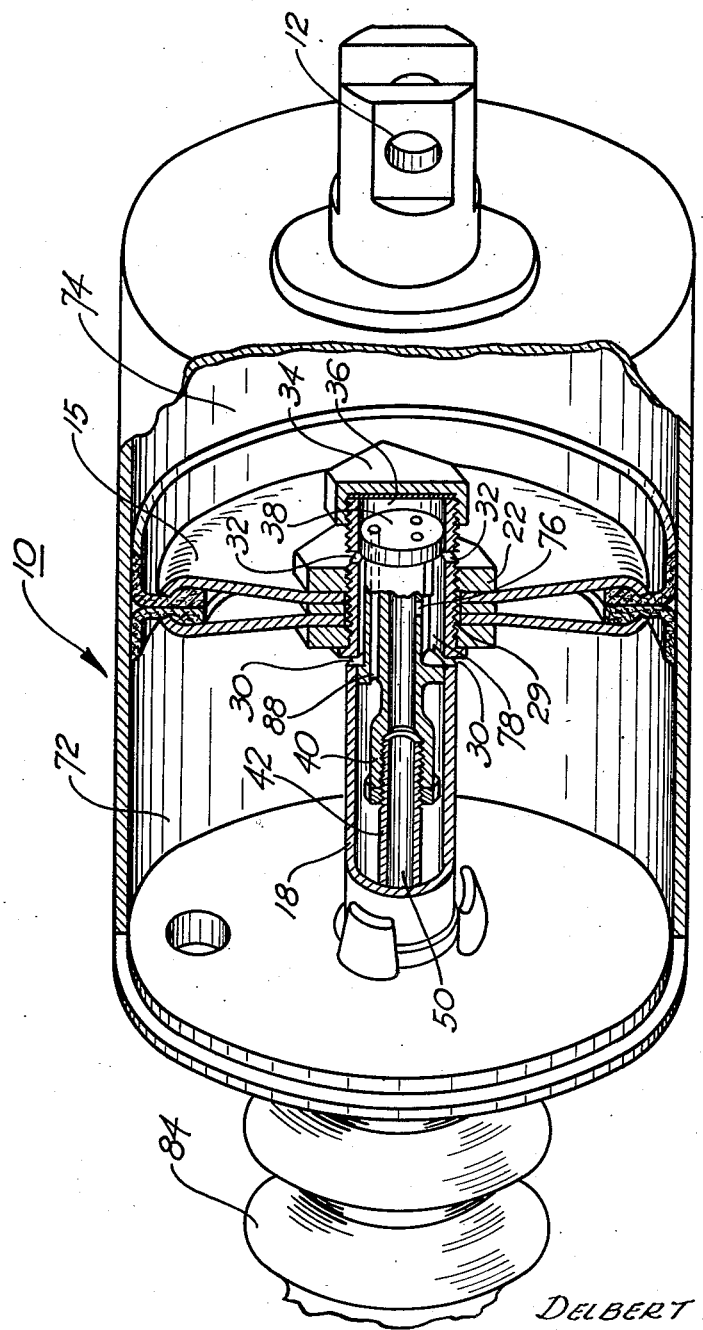
Figure 3 is a view largely in section, disclosing details of the pressure differential operated motor of my invention.

As disclosed in Figure 2 a compression spring 46 is interposed between one end face of the fitting 24 and a portion of the fitting 44; and the latter is provided with ducts 48 and 50 providing air transmitting means to interconnect a conduit 52 and the interior of the hollow tube 42. The conduit 52, which is connected to the fitting 20 by means of a fitting 54, is connected at its other end to the intake manifold 56 of the internal combustion engine 58 of the vehicle. As is well known in this art the intake manifold of an internal combustion engine becomes a source of vacuum by virtue of the pumping action of the pistons of the engine, the degree of vacuum being relatively high when the throttle of the engine is closed to idle said engine.

Completing the description of the mechanism constituting my invention a fitting 60, mounted within the fitting 20, is biased to the right, Figure 2, by a compression spring 62; and both fittings 60 and 44 are provided with opposed recesses to receive a ball member 64 mounted on the end of a pitman arm 66, said arm being angularly moved by the usual gearing 68 mounted on the end of a steering post 70.

Describing now the operation of the power steering mechanism constituting my invention it will be assumed, to facilitate this description, that the engine 58 is idling to make of the intake manifold 56 a source of vacuum and that the front wheels of the vehicle are positioned in their straight ahead position. With this position of the wheels the piston 15 and the valve members 29 and 38 are in their relative positions disclosed in Figure 2 the two end compartments of the motor 10 being at the time partially evacuated by virtue of their connection with the intake manifold; for with the valve members 29 and 38 in the position disclosed in Figure 2 the intake manifold 56 is connected to a motor compartment 72 via the duct 52, ducts 48 and 50, the interior of the tube 42, a port 76 in the spool shaped valve member 38, a recess portion 78 of said valve member and the ports 30. A compartment 74 of the motor 10 is at the same time connected with the recess 78 by the ports 32. It is apparent therefore that the motor 10 is what is defined in this art as a vacuum suspended motor that is one having its two compartments both evacuated when the motor is in its neutral or deenergized state.

To effect a right turn operation of the steering wheels a steering wheel 80 is of course turned to the right, that is, clockwise, and this operation effects a clockwise angular movement of the pitman arm 66. Now if a minimum of force is necessary to effect this turning of the wheels, for example when the wheels are turned on a dry pavement, then there is no substantial compression of the spring 62 to effect a relative movement of the valve parts 29 and 38. It follows therefore that with this operation the spring 62 acts as a force transmitting means, the drag link 18 being bodily moved to effect the desired right turn of the wheels. If, however, a substantial force is necessary to turn the wheels, for example when the vehicle is at a standstill and mired in, say sand or mud, then the aforementioned right turn operation of the steering wheel 80 results in a substantial compression of the spring 62; and this results in a leftward movement of the valve member 38 to connect the motor compartment 74 to the atmosphere. Tracing this connection providing the fluid path, air is admitted to the compartment 74 via an opening 82 in a boot 84, ports 86 in the rod 18, the interior of said rod, ducts 88 in the valve member 38, the aforementioned compartment 36, and the ports 32. This operation serves to energize the motor 10 inasmuch as the compartment 72 at the time remains connected with the source of vacuum. The piston 14 is then subjected to a differential of pressures resulting in its movement to the left, Figure 2, to supplement the manual effort of the driver in effecting the right turn operation of the steering wheels.

If, before the turning operation is completed, the driver should arrest the movement of the steering wheel 80 then a follow-up to lap operation of the valve 29, 38 will be effected; for with this operation the movement of the valve member 38 will be stopped and the valve member 29 will continue its movement until the ports 32 therein are covered by the end portion of the spool shaped valve member 38. The flow of air into the compartment 74 is then abruptly cut off and the movement of the piston 15 comes to an abrupt halt the system being then in equilibrium. To complete the turning operation of the wheels the driver then resumes the right turn operation of the steering wheel thereby again cracking the valve to again energize the motor 10.

To effect a left turn operation of the steering wheels the driver rotates the steering wheel 80 counterclockwise and the resultant counterclockwise angular movement of the pitman arm 66 results in an additional loading of the compression spring 46. As described above if the resistance to movement of the steering wheel is substantial then the spring 46 will be collapsed to operate the control valve 29, 38 to energize the motor; however, if said resistance to movement is relatively light then the steering operation will be effected solely by the physical effort of the driver. The opening and lapping operations of the valve to effect the left turn operation of the motor 10 will not be described here inasmuch as said operations will be apparent from a reading of the above described right turn operation of the power steering mechanism. Suffice it to say that when the spring 46 is compressed the relative movement of the valve parts serves to connect the compartment 72 to the atmosphere thereby energizing the motor 10; and when the steering movement of the steering wheel is arrested then the valve is lapped to arrest the operation of said motor.

There is thus provided, by the steering mechanism of my invention, a compact and effective mechanism by which all normal steering operations are effected solely by the physical effort of the driver the power means of the invention being cut into operation only when needed, that is when a substantial force is necessary to turn the steering wheels. The principal feature of my invention lies in its simplicity and compactness, the fitting 20, together with the spring loaded floating members 60 and 44 therein, providing a very effective force transmitting means for effecting operation of the mechanism.

Although a particular embodiment of my invention has been described, it will be understood by those skilled in the art that the objects of the invention may be attained by the use of constructions different in certain respects from those disclosed without departing from the underlying principles of the invention. I therefore desire by the following claim to include within the scope of my invention all such variations and modifications by which substantially the results of my invention may be obtained through the use of substantially the same or equivalent means.

I claim:

A power steering mechanism for a motor vehicle including a pitman arm, a drag link, force transmitting means interconnecting said pitman arm and drag link including a hollow fitting fixedly secured to said link, said fitting including a port adapted to receive a power fluid transmitting conduit, a plurality of force transmitting members housed within said fitting, said members including a two-part fitting, one of said parts having fluid transmitting ducts therein, one of said ducts registering with the aforementioned port in the hollow fitting, and further including a spring interposed between one end of the two-part fitting and one end of the hollow fitting and another spring interposed between the other end of the two-part fitting and the other end of the hollow fitting, a double-acting pressure differential operated motor including a cylinder member and a piston, a hollow connecting rod interconnecting said piston with the aforementioned hollow fitting, valve means, including two relatively movable parts, for controlling the operation of said motor, said valve means being housed within said cylinder member, a hollow rod housed within said connecting rod and connected at one of its ends to one of the valve parts and at its other end to one part of said two-part fitting to provide a fluid connection between the hollow rod and the other of said ducts, the parts of the aforementioned mechanism being so constructed and arranged and so operative that a movement of the pitman arm results in a compression of one or the other of the aforementioned springs to effect an operation of the valve if the resistance to movement of the drag link is of such a magnitude as to make possible said operation of said spring.

DELBERT P. FISHER.

REFERENCES CITED

The following references are of record in the file of this patent:

UNITED STATES PATENTS

| Number | Name | Date |
| --- | --- | --- |
| 1,830,636 | Bragg | Nov. 3, 1931 |
| 2,022,698 | Vickers | Dec. 3, 1935 |
| 2,212,955 | Price | Aug. 27, 1940 |
| 2,220,339 | Leatham, Sr. | Nov. 5, 1940 |
| 2,227,273 | Price | Dec. 31, 1940 |
| 2,356,492 | Smith | Aug. 22, 1944 |
| 2,368,741 | Bowling | Feb. 6, 1945 |